F. L. FREEMAN.
FRONT WHEEL DRIVE MECHANISM FOR MOTOR VEHICLES.
APPLICATION FILED APR. 9, 1920.
1,416,010.
Patented May 16, 1922.
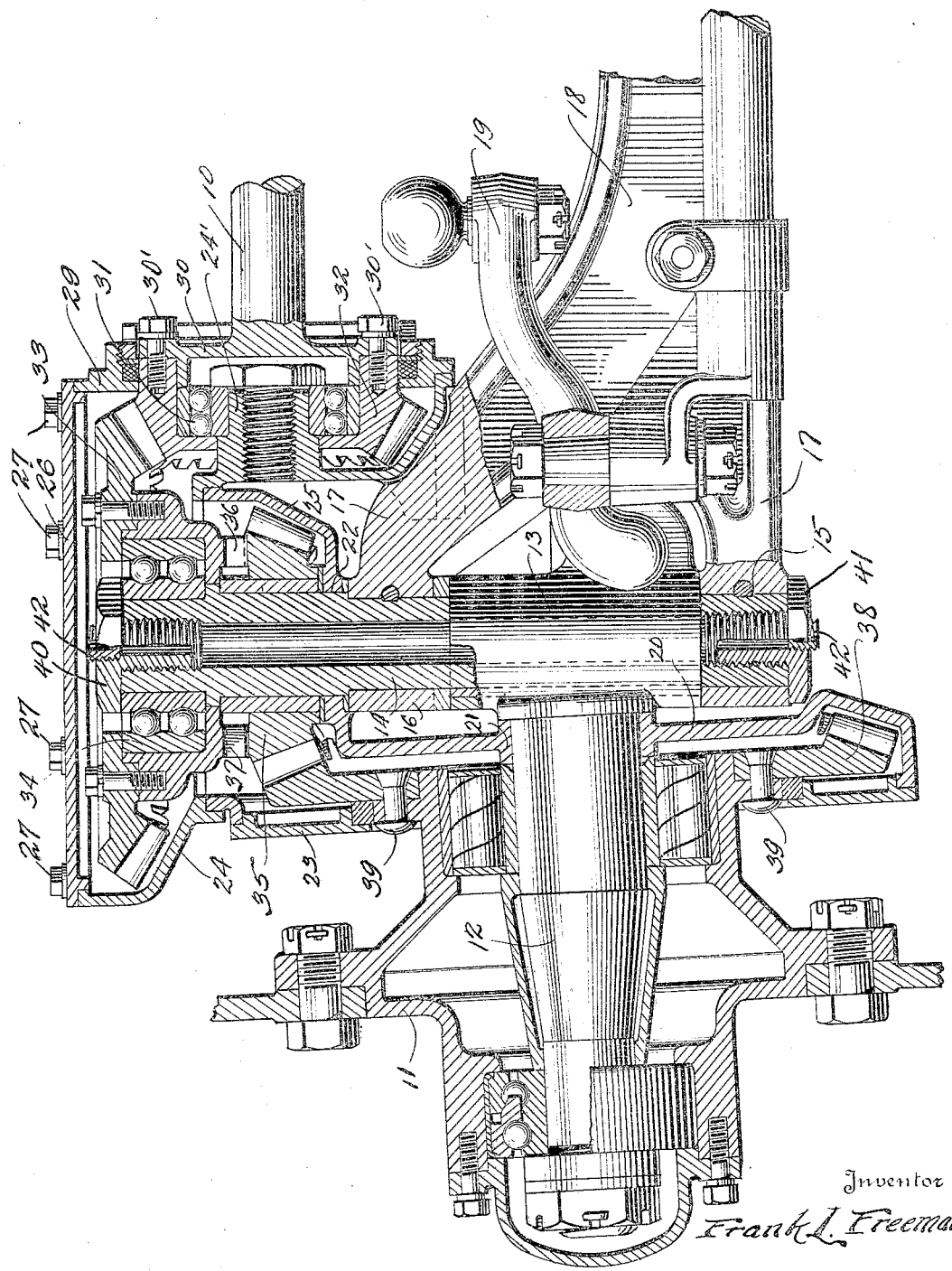
Inventor
Frank L. Freeman
By 
Attorneys.

UNITED STATES PATENT OFFICE.

FRANK L. FREEMAN, OF OMAHA, NEBRASKA.

FRONT-WHEEL DRIVE MECHANISM FOR MOTOR VEHICLES.

1,416,010.   Specification of Letters Patent.   Patented May 16, 1922.

Application filed April 9, 1920. Serial No. 372,529.

*To all whom it may concern:*

Be it known that I, FRANK L. FREEMAN, a citizen of the United States, residing at Omaha, in the county of Douglas, State of Nebraska, have invented certain new and useful Improvements in Front-Wheel Drive Mechanism for Motor Vehicles; and I do hereby declare the following to be a full, clear, and exact description of the invention, such as will enable others skilled in the art to which it appertains to make and use the same.

This invention relates to an improved front wheel drive for a motor vehicle and one object of the invention is to provide an improved type of transmission which will be associated with the power axle, spindle mounting king pin and wheel hub and which will permit proper turning of the spindle for guiding purposes and at the same time retain the gears in proper mesh.

Another object of the invention is to so construct this transmission that it may be enclosed in a housing which will protect the gearing from exposure.

Another object of the invention is to so construct the transmission that it may be easily assembled and to further so construct it that ready access may be had to the gears by the removal of plates which close the housing.

Another object of the invention is to provide a front wheel drive which will be comparatively simple in construction, strong and durable, and not liable to readily get out of order.

This invention is illustrated in the accompanying drawing wherein is shown a sectional view of the improved front wheel drive.

This improved transmission, transmits rotary movement from the power or live axle 10 to the wheel hub 11 which is rotatably mounted upon the spindle 12, the spindle being provided with the usual vertically extending bearing sleeve 13 at its inner end through which extends the hollow king pin 14. This king pin 14 extends through the bearings 15 and 16 carried by the forks 17 of the dead axle or load carrying axle 18 upon which the forward end portion of the chassis will be mounted. The stearing gear which is indicated in general by the numeral 19 is of a conventional construction and is connected with the spindle in the usual manner so that the spindle may be swung to guide the automobile.

A housing which is indicated in general by the numeral 20 is provided with a bearing 21 through which the spindle 12 extends and a bearing 22 through which the king pin extends above the upper bearing 16 and this housing is provided with an open outer side normally closed by the removable disk 23. A second housing section which is indicated in general by the numeral 24 is supported upon the cup 25 of the lower housing section 20 and this upper housing section is provided with an upper opening closed by the cap or disk 26 which is clamped in place by the securing screws 27. The inner side portion of this upper housing section is also open and normally closed by a cap 29 which is in the form of a packing gland and receives the head 30 of the axle 10.

A gear 32 is positioned within the upper housing section and is provided with an extended hub which is connected with the head 30 of the axle 10 by bolts 30' and carries a bearing 31 fitting upon a stub shaft extension 24'. This gear 32 meshes with the gear 33 which is rotatably mounted upon the upper portion of the king pin 14 and carries a bearing 34. A gear 35 which is also a beveled gear is positioned beneath the gear 33 and may be formed integrally with gear 33 or may be formed separate from the gear 33 and provided with clutch teeth 36 for engagement by clutch teeth 37 formed upon the lower portion of the upper gear. Therefore the lower gear 35 will at all times rotate with the upper gear 33. The lower gear meshes with the beveled gear 38 which fits upon the inner end portion of the wheel hub 11 and is rigidly connected with the wheel hub by rivets 39 so that when the axle 10 is rotated rotary movement will be transmitted to the wheel hub. It should be noted that gear 38 is such size that the wheel hub and gear may be passed into the housing 20 through the open outer side and the closure disk or cap 23 then put in place to close the opening, the cap being of course placed about the inner portion of the hub 11 before the gear 38 is connected with the hub. Securing screws 40 and 41 are provided to hold the king pin in place and have longitudinally extended passages closed by screw plugs 42. These plugs may be removed when it is desired to fill the hollow king pin with oil.

When in use the transmission will be assembled as shown in the drawing and upon rotation of the axle 10 the gears within the upper and lower housing section will be rotated and rotary movement thus transmitted to the wheel. When the steering gear is operated to guide the automobile the spindle will be swung upon the king pin which forms a stationary pivot and the gear 38 will move about the gear 35 without moving out of engagement with this gear or causing the teeth of the two gears to lock. When it is desired to have access to the interior of the lower housing section the cap 23 can be easily removed and when it is desired to have access to the upper housing section the cap 26 or cap 29 may be disconnected from the upper housing section.

It will further be noted that the cap screw 40 which engages the upper end of the king bolt serves by reason of the overlapping engagement of its head to secure the bearing 34 in place and thereby insures the stable mounting of the upper member 33 of the double gear, which as above noted is preferably constructed of separable sections or members and in reference to which, this construction is preferred by reason of facilitating the manufacture or the cutting of the gear faces and also the facility with which the parts can be assembled and replaced when worn, or in the event of injury.

Moreover it is to be noted that the connection between the housing sections or members is in the form of a swivel occurring in the plane substantially of the lower side of the upper member of the double gear, where an interlocking relation is established, the upper housing member being secured to and remaining stationary with the load carrying axle, so that the bearing of the adjacent end of the drive shaft or driving axle can not be disturbed or be subject to angular displacement or twisting, while the lower member of the housing is free to turn with the movement of the spindle in the steering of the machine.

It should further be observed that the stub axle 24′, upon which the driving gear 32 is directly mounted, is formed as an extension of the upper housing member, and that the end of the driving shaft or axle 10 is detachably secured to said gear from the outer-side of the housing, so that the possibility of dust entering the housing at this point is minimized, while the gear itself and its mounting including the bearing are readily accessible without displacement of the other elements of the mechanism, for cleaning and repair.

What is claimed is:

1. A front wheel drive comprising a dead axle having bearings at its outer end, a king pin extended through and above the bearings, a driving axle, a spindle mounted upon the king pin between the bearings, a housing structure having swiveled members supported respectively upon the spindle and king pin, a wheel hub rotatably mounted upon the spindle, a gear loosely mounted upon the upper portion of the king pin within the housing, a gear carried by the driving axle and meshing with the first gear, a gear positioned beneath and turning with the first gear, and a gear carried by the wheel hub and meshing with the last gear.

2. A front wheel drive comprising a dead axle, a king pin carried by the dead axle, a driving axle, a spindle loosely mounted upon the king pin, a housing having a lower section mounted upon the spindle and the king pin and an upper section carried by the driving axle which extends into the upper section of the housing said sections having a swivel connection, a wheel hub rotatably mounted upon the spindle and extending into the lower section of the housing, a gear carried by the wheel hub within the lower section of the housing, a gear carried by the driving axle within the upper section of the housing, and a gear loosely mounted upon the upper portion of the king pin and having an upper section meshing with the gear of the driving axle and a lower section meshing with the gear carried by the wheel hub.

3. A transmission for a front wheel drive comprising a dead axle, a king pin carried by the dead axle, a driving axle, a spindle mounted upon the king pin, a gear sectional housing having relatively swiveled members carried by the king pin and spindle and having an extension providing a stub-shaft in alignment with the driving axle, a gear connected with the driving axle and mounted upon the stub-shaft, a wheel hub mounted upon the spindle and extending into the lower portion of the housing, a gear carried by the wheel hub within the housing, and a gear mounted upon the king pin and having upper and lower sections rotating together and meshing with the gears carried by the driving axle and wheel hub.

4. A front wheel drive, having a load carrying axle, bifurcated to form upper and lower bearings, a king pin fitted in and keyed to said bearings, a wheel spindle having a sleeve mounted upon the king pin between said upper and lower bearings, a wheel hub mounted upon the spindle and carrying a gear, a sectional housing having a lower member swiveled upon the king bolt and enclosing said hub carried gear and an upper member swiveled upon the lower member and secured to the load carrying axle, said upper housing member being provided in the plane of the load carrying axle with an inwardly directed stub shaft, a drive gear mounted upon the stub shaft within the upper housing member, a double gear mounted upon the king pin and having its members in meshing relation respectively with said drive gear and hub carried gear, and a driving axle or shaft having a head detachably secured to said drive gear.

5. A front wheel drive, having a load carrying axle, bifurcated to form upper and lower bearings, a king pin fitted in and keyed to said bearings, a wheel spindle having a sleeve mounted upon the king pin between said upper and lower bearings, a wheel hub mounted upon the spindle and carrying a gear, a sectional housing having a lower member swiveled upon the king bolt and enclosing said hub carried gear and an upper member swiveled upon the lower member and secured to the load carrying axle, said upper housing member being provided in the plane of the load carrying axle with an inwardly directed stub shaft, a drive gear mount upon the stub shaft within the upper housing member, a double gear mounted upon the king pin and having its members in mashing relation respectively with said drive gear and hub carried gear, a driving axle or shaft having a head detachably secured to said drive gear, and the king pin being of tubular construction fitted terminally with removable cap screws for overlapping relation with the terminals of the pin.

6. A front wheel drive, having a load carrying axle, bifurcated to form upper and lower bearings, a king pin fitted in and keyed to said bearings, a wheel spindle having a sleeve mounted upon the king pin between said upper and lower bearings, a wheel hub mounted upon the spindle and carrying a gear, a sectional housing having a lower member swiveled upon the king bolt and enclosing said hub carried gear and an upper member swiveled upon the lower member and secured to the load carrying axle, said upper housing member being provided in the plane of the load carrying axle with an inwardly directed stub shaft, a drive gear mounted upon the stub shaft within the upper housing member, a double gear mounted upon the king pin and having its members in meshing relation respectively with said drive gear and hub carried gear, a driving axle or shaft having a head detachably secured to said drive gear, the king pin being of tubular construction fitted terminally with removable cap screws for overlapping relation with the terminals of the pin, and the upper member of the double gear being provided with an antifriction bearing, engaged and held in place by the head of the upper cap screw.

7. A front wheel drive, having a load carrying axle, bifurcated to form upper and lower bearings, a king pin fitted in and keyed to said bearings, a wheel spindle having a sleeve mounted upon the king pin between said upper and lower bearings, a wheel hub mounted upon the spindle and carrying a gear, a sectional housing having a lower member swiveled upon the king bolt and enclosing said hub carried gear and an upper member swiveled upon the lower member and secured to the load carrying axle, said upper housing member being provided in the plane of the load carrying axle with an inwardly directed stub shaft, a drive gear mounted upon the stub shaft within the upper housing member, a double gear mounted upon the king pin and having its members in meshing relation respectively with said drive gear and hub carried gear, a driving axle or shaft having a head detachably secured to said drive gear, and the lower housing member having an open side facing or hub, and a diameter equal to the hub carried gear to permit of introduction of the latter, and being fitted with a removable cap screw.

8. A front wheel drive, having a load carrying axle, bifurcated to form upper and lower bearings, a king pin fitted in and keyed to said bearings, a wheel spindle having a sleeve mounted upon the king pin between said upper and lower bearings, a wheel hub mounted upon the spindle and carrying a gear, a sectional housing having a lower member swiveled upon the king bolt and enclosing said hub carried gear and an upper member swiveled upon the lower member and secured to the load carrying axle, said upper housing member being provided in the plane of the load carrying axle with an inwardly directed stub shaft, a drive gear mounted upon the stub shaft within the upper housing member, a double gear mounted upon the king pin and having its members in meshing relation respectively with said drive gear and hub carried gear, a driving axle or shaft having a head detachably secured to said drive gear, and the driving gear having an antifriction bearing of which the outer ring is engaged by an inwardly directed flange on the head of the drive shaft or axle.

In testimony whereof, I affix my signature in the presence of two witnesses.

FRANK L. FREEMAN.

Witnesses:
GERTRUDE CROFT,
L. R. CARTER.